(12) United States Patent
Takamoto

(10) Patent No.: US 7,730,803 B2
(45) Date of Patent: Jun. 8, 2010

(54) SWITCH DESIGNATION APPARATUS FOR A BICYCLE CONTROL UNIT

(75) Inventor: Ryuichiro Takamoto, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 1178 days.

(21) Appl. No.: 10/907,547

(22) Filed: Apr. 5, 2005

(65) Prior Publication Data

US 2005/0223840 A1    Oct. 13, 2005

(30) Foreign Application Priority Data

Apr. 9, 2004  (JP)  .............................. 2004-115582

(51) Int. Cl.
*B60K 17/12* (2006.01)
(52) U.S. Cl. .................................................. 74/473.12
(58) Field of Classification Search .................. 74/469, 74/473.12, 473.13, 551.8; 280/260, 261; 200/61.85, 61.91
See application file for complete search history.

(56) References Cited

U.S. PATENT DOCUMENTS

| | | | |
|---|---|---|---|
| 4,490,127 A | 12/1984 | Matsumoto et al. | |
| 5,483,137 A * | 1/1996 | Fey et al. | 318/560 |
| 5,514,041 A * | 5/1996 | Hsu | 474/78 |
| 2003/0234163 A1* | 12/2003 | Ichida et al. | 200/4 |

FOREIGN PATENT DOCUMENTS

| | | |
|---|---|---|
| DE | 10153487 A1 | 5/2003 |
| EP | 1375325 A2 | 1/2004 |
| JP | 06-266500 A | 9/1994 |
| JP | 2002-137786 A | 5/2002 |
| JP | 2003-083597 A | 3/2003 |
| JP | 2003-153052 A | 5/2003 |

OTHER PUBLICATIONS

European search report for EP 05007567.0, the European patent application that corresponds to this application, dated Jun. 23, 2006.

* cited by examiner

*Primary Examiner*—Vicky A Johnson
(74) *Attorney, Agent, or Firm*—James A. Deland

(57) ABSTRACT

A switch designation apparatus for a bicycle control unit comprises a first switch structured to be mounted to a bicycle for providing signals to move a moving bicycle control device, a second switch structured to be mounted to the bicycle for providing signals to move the moving bicycle control device, and a switch designation unit that allows a user to selectively designate movements of the bicycle control device signaled by at least one of the first switch and the second switch.

18 Claims, 11 Drawing Sheets

SWITCH DESIGNATION APPARATUS FOR A BICYCLE CONTROL UNIT

BACKGROUND OF THE INVENTION

The present invention is directed to bicycles and, more particularly, to a switch designation apparatus for adjusting a position of a bicycle control unit.

Bicycle transmissions that comprise front and rear derailleurs are well known. The front derailleur shifts a chain among a plurality of front sprockets that are coaxially mounted to the pedal crank shaft, and the rear derailleur shifts the chain among a plurality of rear sprockets that are coaxially mounted to the rear wheel. It is also known to use electric motors to operate the front and rear derailleurs. Such a system is shown in Japanese Kokai Patent Application No. 2001-267002.

Bicycle transmissions formed inside the bicycle wheel hub (often called internal hub transmission) also are well known. Such transmissions include a planetary gear mechanism mounted inside the hub for communicating rotational force from a drive sprocket to the wheel hub shell through a plurality of transmission paths representing different gear ratios. It is also known to use electric motors to select the desired transmission paths. Such a system is shown in Japanese Patent Application No. 3-231006.

An apparatus for controlling the operation of a bicycle transmission having electrically operated derailleurs typically comprises one or more shift control devices mounted to one or more sides of the bicycle handlebar. For example, a shift control device for controlling the operation of the front derailleur may be mounted to the left side of the handlebar, and a shift control device for controlling the operation of the rear derailleur may be mounted to the right side of the handlebar. Each shift control device may comprise a switch for upshifting its corresponding derailleur and a switch for downshifting its corresponding derailleur, wherein the upshift and downshift switches are arranged vertically in a row. A shift control device for an internal hub transmission may comprise a switch for upshifting the internal hub transmission and a switch for downshifting the internal hub transmission, wherein both switches are mounted horizontally in a row on the right side of the handlebar.

Whether the switches are arranged vertically or horizontally, the upshift and downshift operations of the switches are fixed. However, some riders may prefer a reversal of the physical arrangement of the upshift and downshift switches. In other words, while one rider may prefer the upshift switch located above the downshift switch, other riders may prefer the downshift switch to be located above the upshift switch. With conventional shift control devices, this would require mounting the shift control device upside down or rewiring the device. Mounting the device upside down would result in any printing on the device also being upside down, and the switches may be oriented in a non-ergonomic manner. Rewiring the device would be very complex and troublesome.

SUMMARY OF THE INVENTION

The present invention is directed to a switch designation apparatus for adjusting a position of a bicycle control unit. In one embodiment, a switch designation apparatus for a bicycle control unit comprises a first switch structured to be mounted to a bicycle for providing signals to move a moving bicycle control device, a second switch structured to be mounted to the bicycle for providing signals to move the moving bicycle control device, and a switch designation unit that allows a user to selectively designate movements of the bicycle control device signaled by at least one of the first switch and the second switch. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
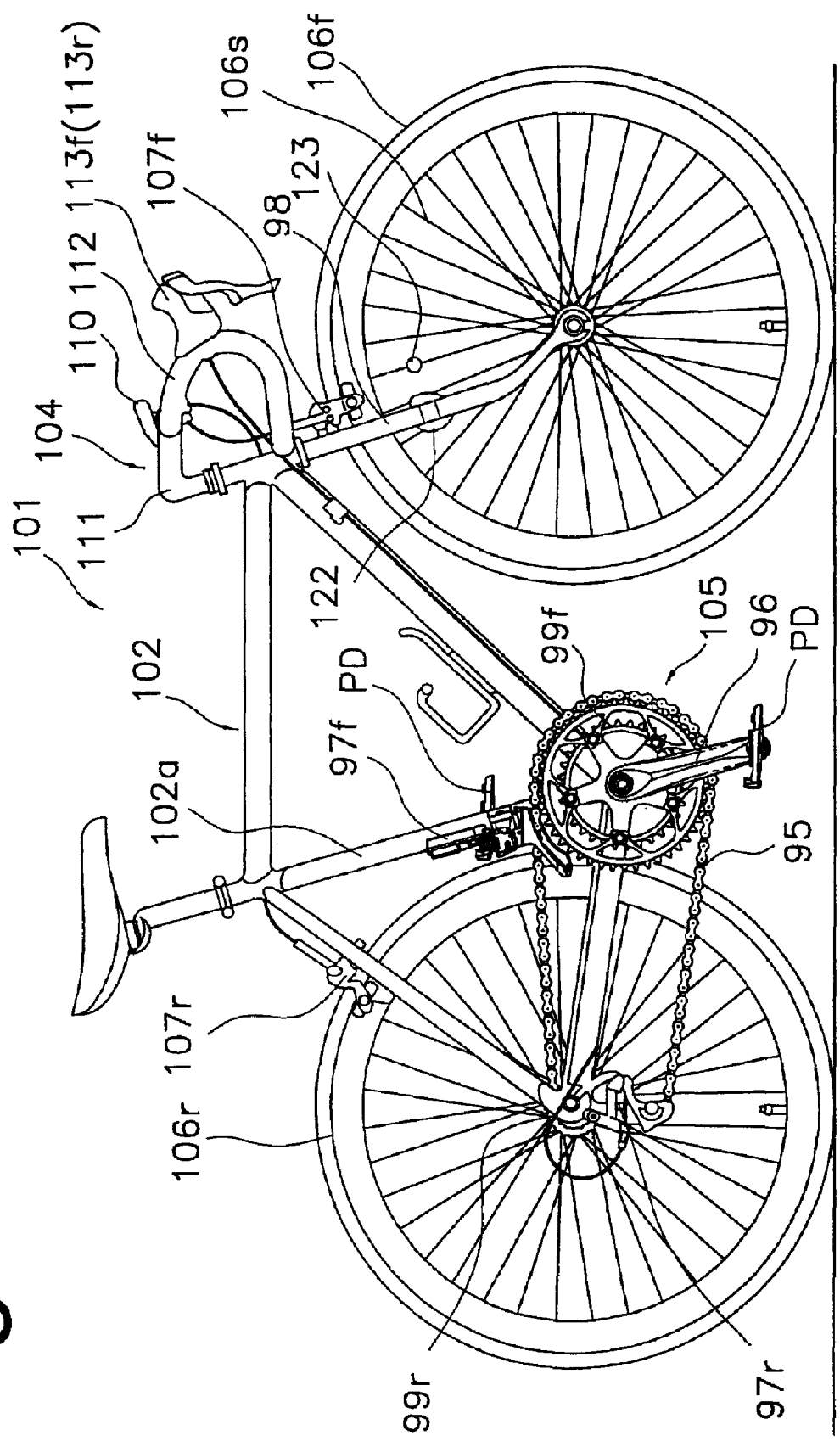
FIG. 1 is a side view of a particular embodiment of a bicycle.

FIG. 1 is a side view of a bicycle 101 that includes particular embodiments of electrically controlled bicycle control devices. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Figure 5:
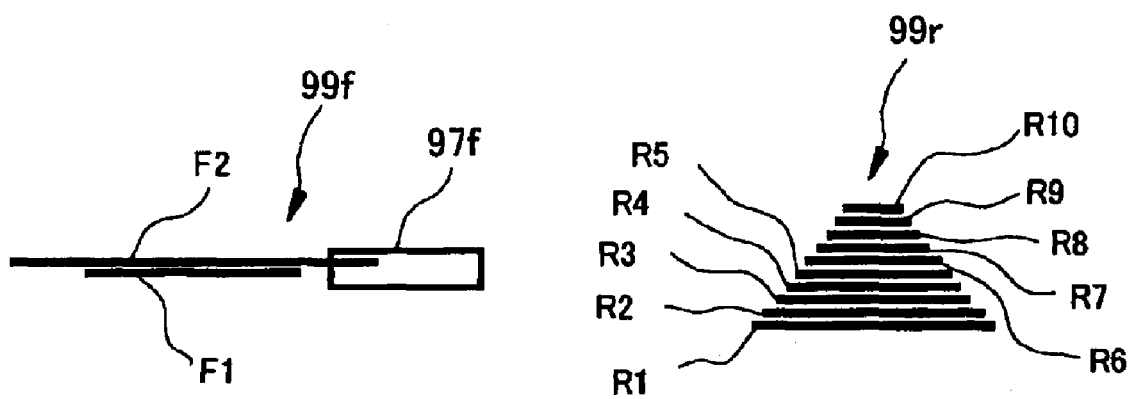
FIG. 5 is a schematic diagram of the front and rear sprocket assemblies.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. As shown in FIG. 5, front sprocket assembly 99f comprises two coaxially mounted sprockets F1-F2, and rear sprocket assembly 99r comprises ten sprockets R1-R10 mounted coaxially with an axle of rear wheel 106r. The number of teeth on front sprocket F1 is less than the number of teeth on front sprocket F2. The numbers of teeth on rear sprockets R1-R10 gradually decrease from rear sprocket R1 to rear sprocket R10. As a result, rear sprocket R1 has the greatest number of teeth, and rear sprocket R10 has the least number of teeth. Front derailleur 97f moves to two operating positions to switch chain 95 between front sprockets F1 and F2, and rear derailleur 97r moves to ten operating positions to switch chain 95 among selected ones of the rear sprockets R1-R10. A front gear position sensor 133f (FIG. 6) senses the operating position of front derailleur 97f, and a rear gear position sensor 133r senses the operating position of rear derailleur 97r. Gear position sensors 133f and 133r may comprise rotary encoders such as potentiometers, or some other devices. A battery or some other power source (not shown) powers front and rear derailleurs 97f and 97r as well as other electrical components described herein in a known manner.

Figure 2:
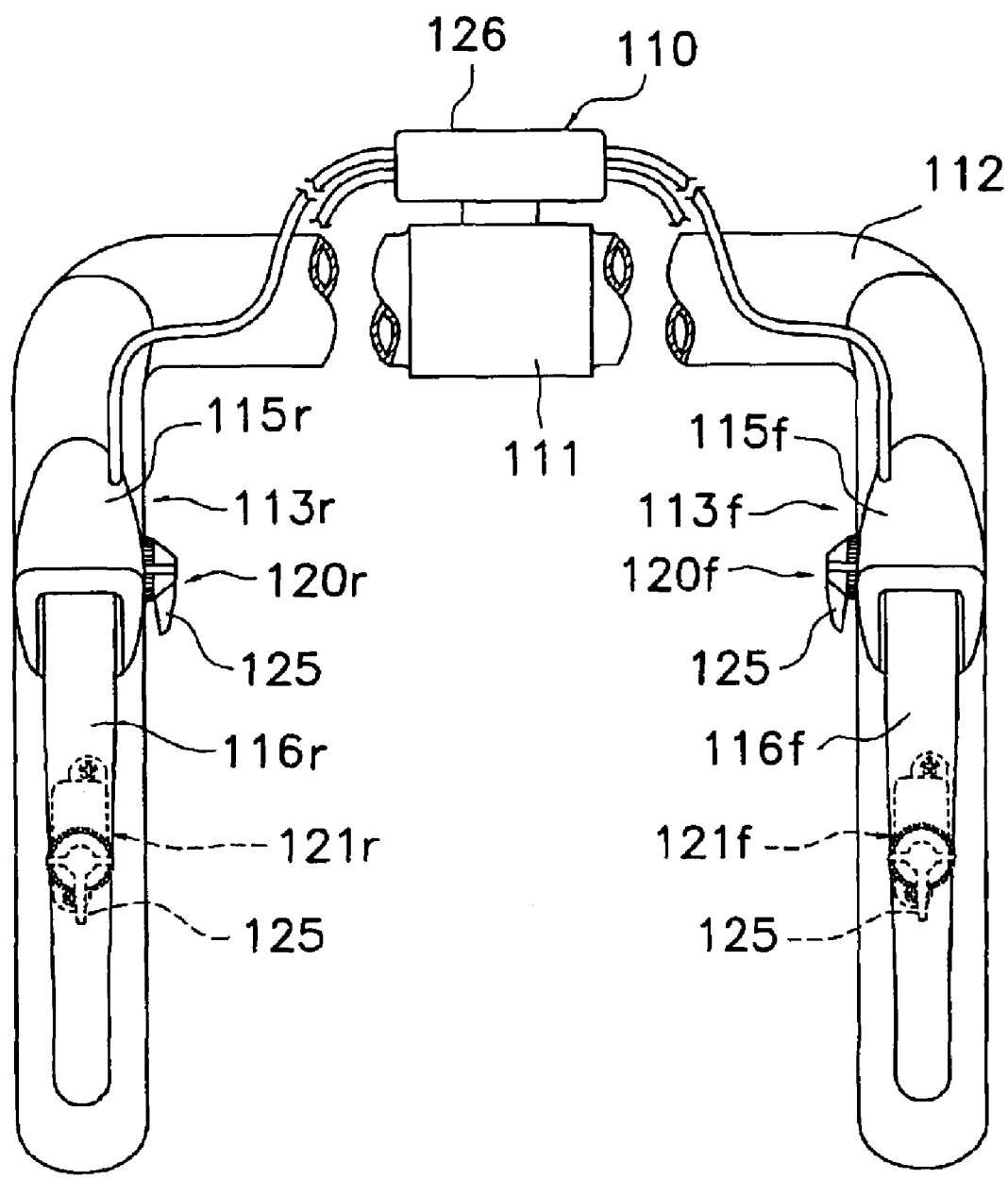
FIG. 2 is a front view of particular embodiments of brake lever assemblies mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113f and 113r are mounted at opposite sides of handlebar 112. Brake lever assembly 113f controls the operation of front wheel brake 107f, and brake lever assembly 113r controls the operation of rear wheel brake 107r. A derailleur control device 110 is mounted to a central portion of handlebar 112.

Figure 3:
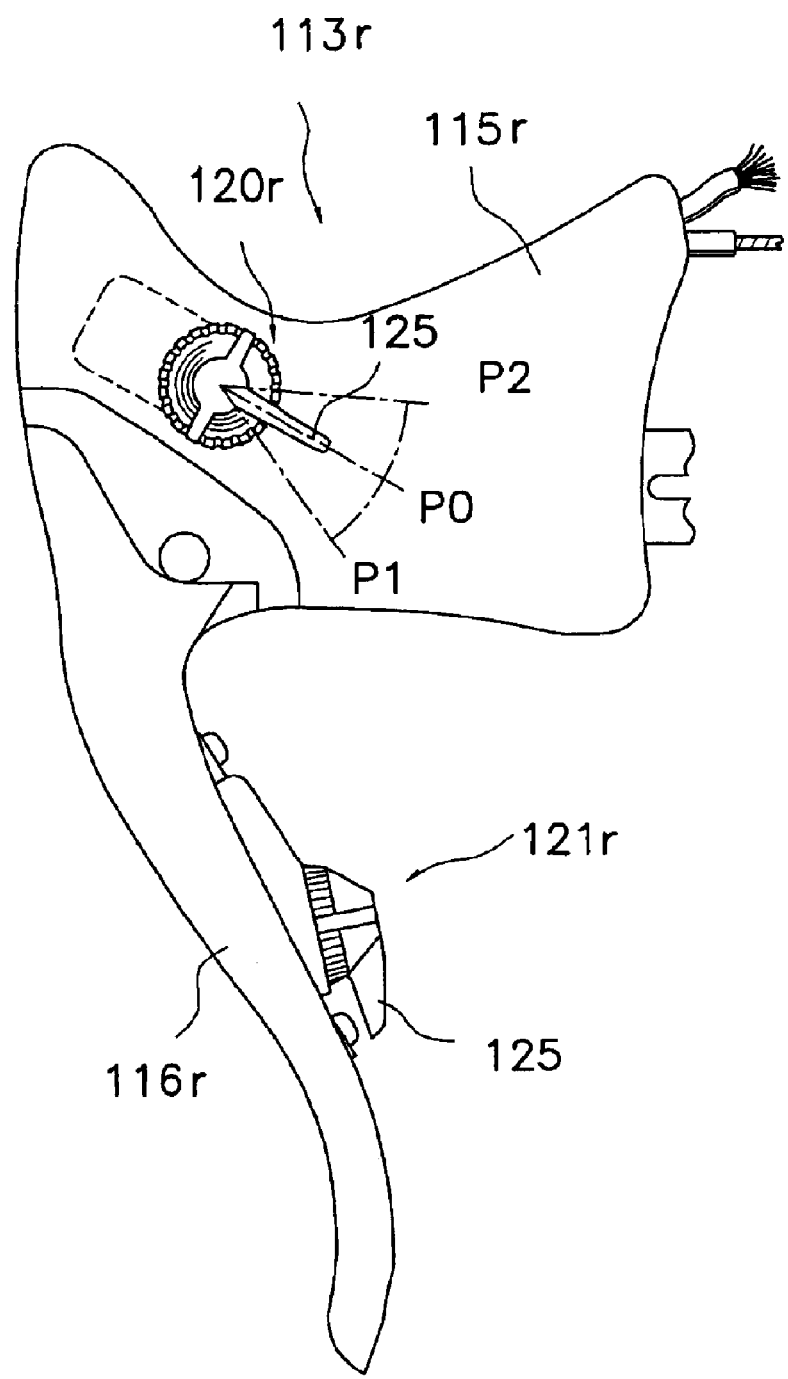
FIG. 3 is a side view of the rear brake lever assembly.
Figure 4:
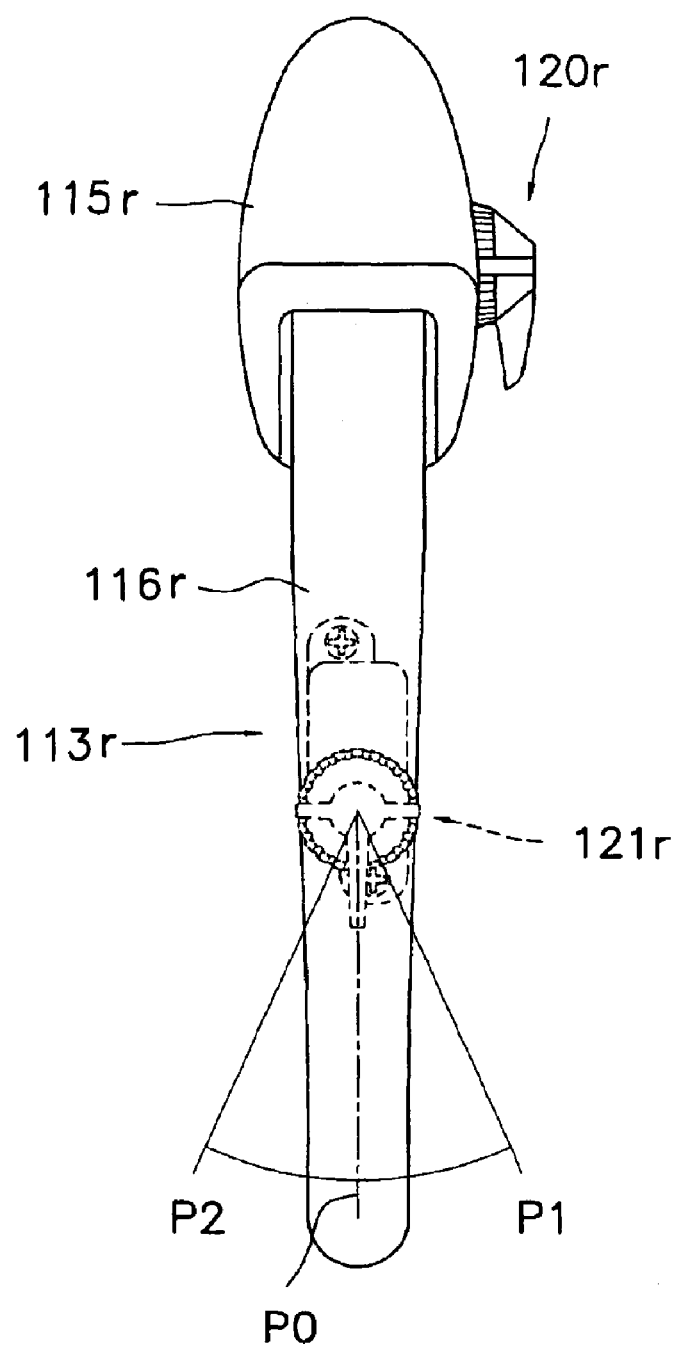
FIG. 4 is a front view of the rear brake lever assembly.

Brake lever assemblies 113f and 113r comprise respective brake brackets 115f and 115r mounted to the forward curved portions of handlebar 112, and brake levers 116f and 116r pivotably mounted to brake brackets 115f and 115r. Rear shift control devices 120r and 121r with operating members such as switch levers 125 are mounted to the inner side of brake bracket 115r and to the rear side of brake lever 116r, respectively, to control the operation of rear derailleur 97r. In this embodiment, rear shift control devices 120r and 121r independently control the operation of rear derailleur 97r so that the rider may control the operation of rear derailleur 97r with the hand grasping brake bracket 115r or with the hand grasping brake lever 116r. As shown in FIG. 3, the switch lever 125 mounted to brake lever bracket 115r rotates downward from a home position P0 to a first position P1 and rotates upward from home position P0 to a second position P2 to control the operation of rear derailleur 97r. As shown in FIG. 4, the switch lever 125 mounted to the rear of brake lever 116r rotates laterally inward from a home position P0 to a first position P1 and rotates laterally outward from home position P0 to a second position P2 to control the operation of rear derailleur 97r. Similarly, independent front shift control devices 120f and 121f with switch levers 125 are mounted to the inner side of brake bracket 115f and to the rear side of brake lever 116f, respectively, to control the operation of front derailleur 97f. The switch levers 125 mounted to brake lever bracket 115f and brake lever 116f operate in the same manner as switch levers 125 mounted to brake lever bracket 115r and brake lever 116r. All of the switch levers 125 are biased toward the home position P0.

A front first switch 131f (FIG. 6) and a front second switch 132f are mounted in each front shift control device 120f and 121f. The front first switches 131f operate when switch levers 125 in front shift control devices 120f and 121f rotate from position P0 to position P1, and the front second switches 132f operate when switch levers 125 in front shift control devices 120f and 121f rotate from position P0 to position P2. Similarly, a rear first switch 131r and a rear second switch 132r are mounted in each rear shift control device 120r and 121r. The rear first switches 131r operate when switch levers 125 in rear shift control devices 120r and 121r rotate from position P0 to position P1, and the rear second switches 132r operate when switch levers 125 in rear shift control devices 120r and 121r rotate from position P0 to position P2. Of course, many different switch combinations that operate in many different ways may be provided to suit different applications.

Figure 6:
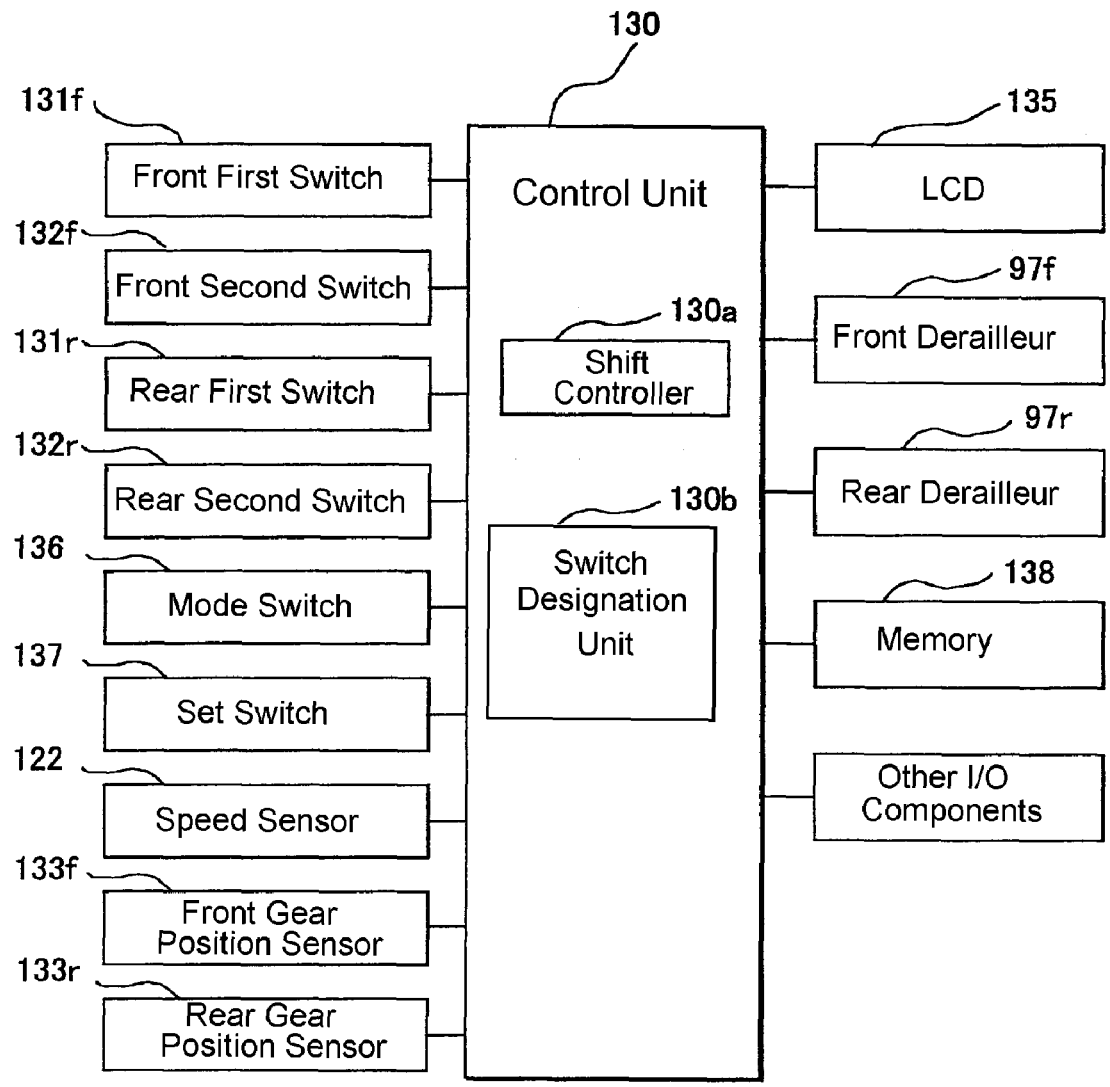
FIG. 6 is a schematic block diagram of a particular embodiment of a derailleur control apparatus.
Figure 7:
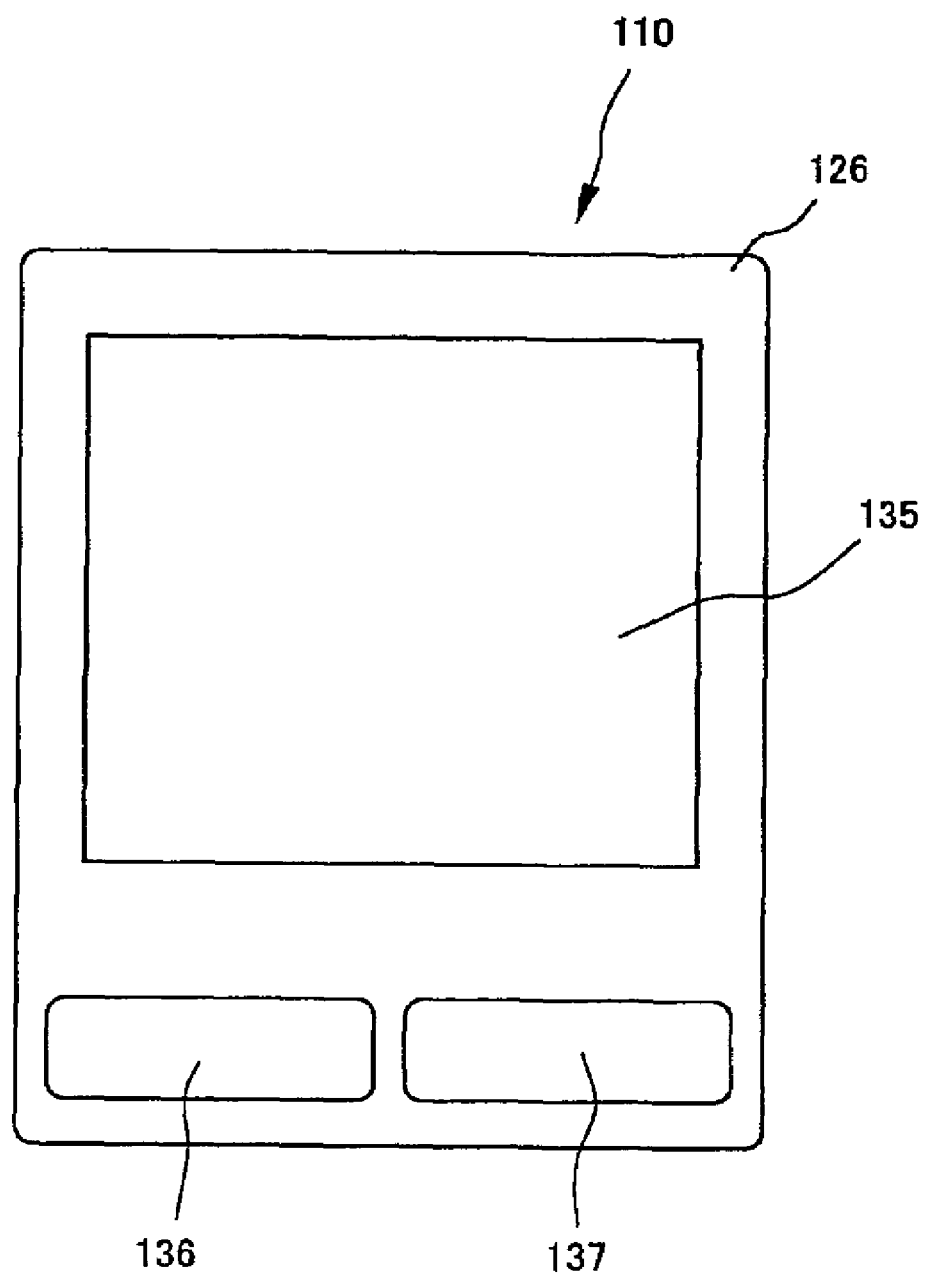
FIG. 7 is a plan view of a gear shift controller housing.

As shown in FIGS. 2, 6 and 7, derailleur control device 110 comprises a case 126 mounted onto the central portion of handlebar 112. Mounted within case 126 are a control unit 130, a liquid crystal display (LCD) 135 for displaying riding parameters and other information, a mode switch 136 and a set switch 137. Front derailleur 97f, rear derailleur 97r, front first switch 131f, front second switch 132f, rear first switch 131r, rear second switch 132r, front gear position sensor 133f, rear gear position sensor 133r and other I/O units are connected to control unit 130 through appropriate methods such as wired or wireless devices. A storage unit such as a memory 138 stores various parameters used in the operation of control unit 130. For example, the operating (sprocket) positions (FP, RP) based on the front sprockets FS (S=1, 2) and rear sprockets RS (S=1-10) for the front and rear derailleurs 97f and 97r are stored in accordance with values detected by gear position sensors 133f and 133r. As shown in FIGS. 1 and 6, a speed sensor 122 is mounted to fork 98 to sense the passage of a magnet 123 mounted to a spoke 106s of front wheel 106s and to provide speed indicating signals to control unit 130.

In this embodiment, control unit 130 comprises a programmed microprocessor. Control unit 130 includes a gear shift controller 130a and a switch designation unit 130b. Gear shift controller 130a controls the operation of front derailleur 97f and rear derailleur 97r in a normal mode of operation such as a gear shift mode (for example) to shift chain 95 the distance from an origin sprocket to a destination sprocket in accordance with signals received from front and rear first switches 131f and 131r, front and rear second switches 132f and 132r, and front and rear gear position sensors 133f and 133r. Switch designation unit 130b designates the operation of front and rear first switches 131f and 131r and front and rear second switches 132f and 132r. In this embodiment, switch designation unit 130b designates whether front and rear first switches 131f and 131r and front and rear second switches 132f and 132r signal upshifting or downshifting operations for front derailleur 97f and rear derailleur 97r when control unit 130, and hence switch designation unit 130b, are in a switch designation mode. Control unit 130 also displays speed, gear positions, and running distance on LCD 135 based on signals received from speed sensor 122 and gear position sensors 133f and 133r.

Mode switch 136 is used to select the gear shift and switch designation modes of operation of control unit 130. Mode switch 136 also is used to alternate among the various display modes available to LCD 135. Set switch 137 is used to enter the mode selected by mode switch 136. In general, when control unit 130 is in switch designation mode and front and rear, the first and second switches 131f, 131r, 132f, and 132r which are turned on while in this mode are designated for upshift operation (SU), whereas switches 131f, 131r, 132f, and 132r which are not turned on are designated for downshift operation (SD). The designations are stored in memory 138, and gear shift controller 130a uses these designations to upshift and downshift front derailleur 97f and rear derailleur 97r when control unit 130 reverts to the gear shift mode.

Figure 8:
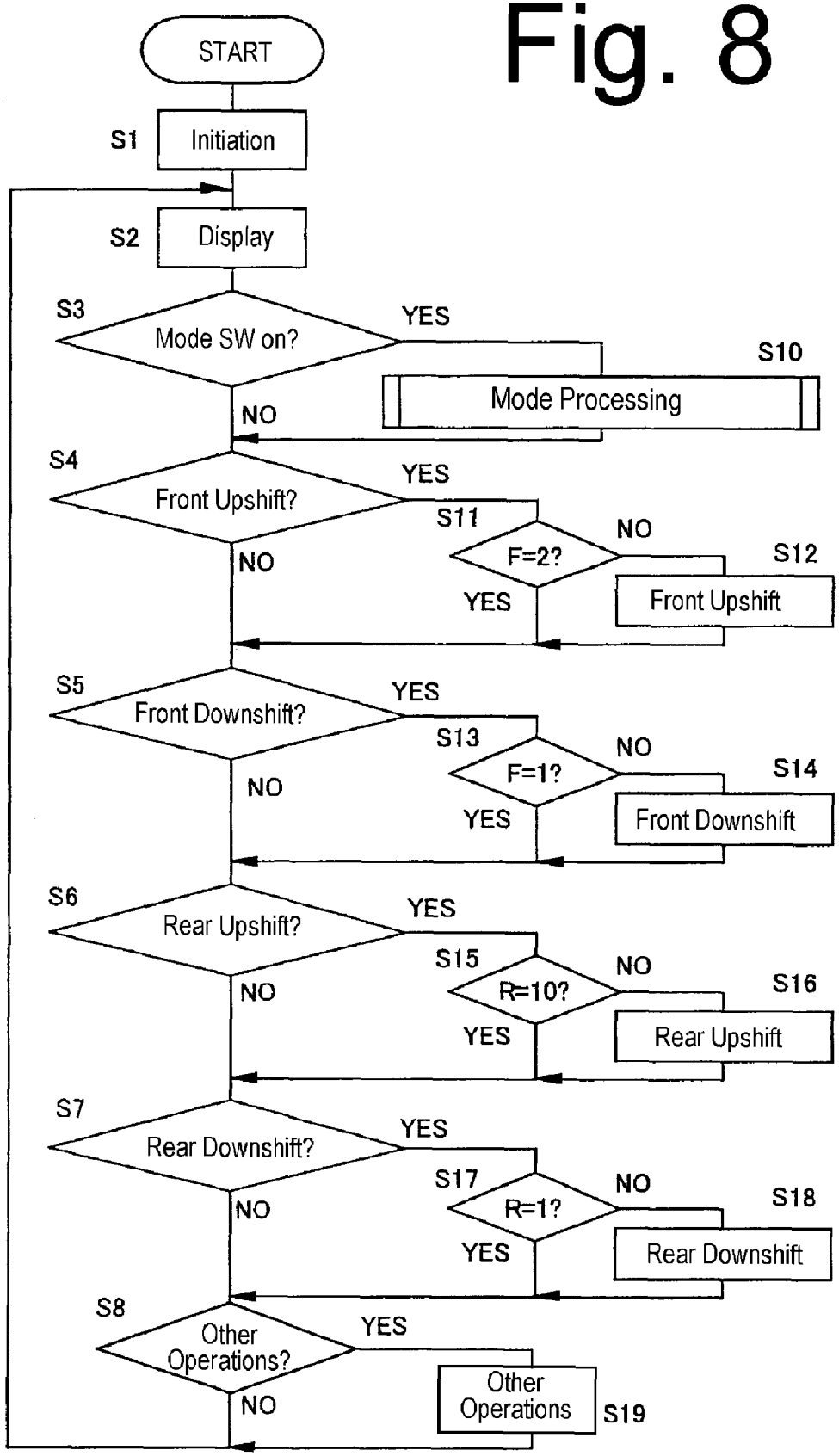
FIG. 8 is a flow chart of a particular embodiment of a main process for the derailleur control apparatus.

FIG. 8 is a flow chart of a particular embodiment of a main process for control unit 130. Initialization is carried out in a step S1 when power is supplied to control unit 130. In this step, various flags and variables are reset, the current switch designations for switches 131f, 131r, 132f, and 132r are retrieved from memory 138 and stored in the microprocessor memory, and control unit 130 is set by default into gear shift mode. In step S2, display processing is performed. In this step, the speed and distance ridden are displayed on LCD 135 based on signals from speed sensor 133, and the sprocket positions of front and rear derailleurs 97f and 97r are displayed based on the output from front and rear gear position sensors 133f and 133r. It is then determined in a step S3 whether or not mode switch 136 has been turned on. If so, then the mode processing routine shown in FIG. 9 is performed in a step S10.

Figure 9:
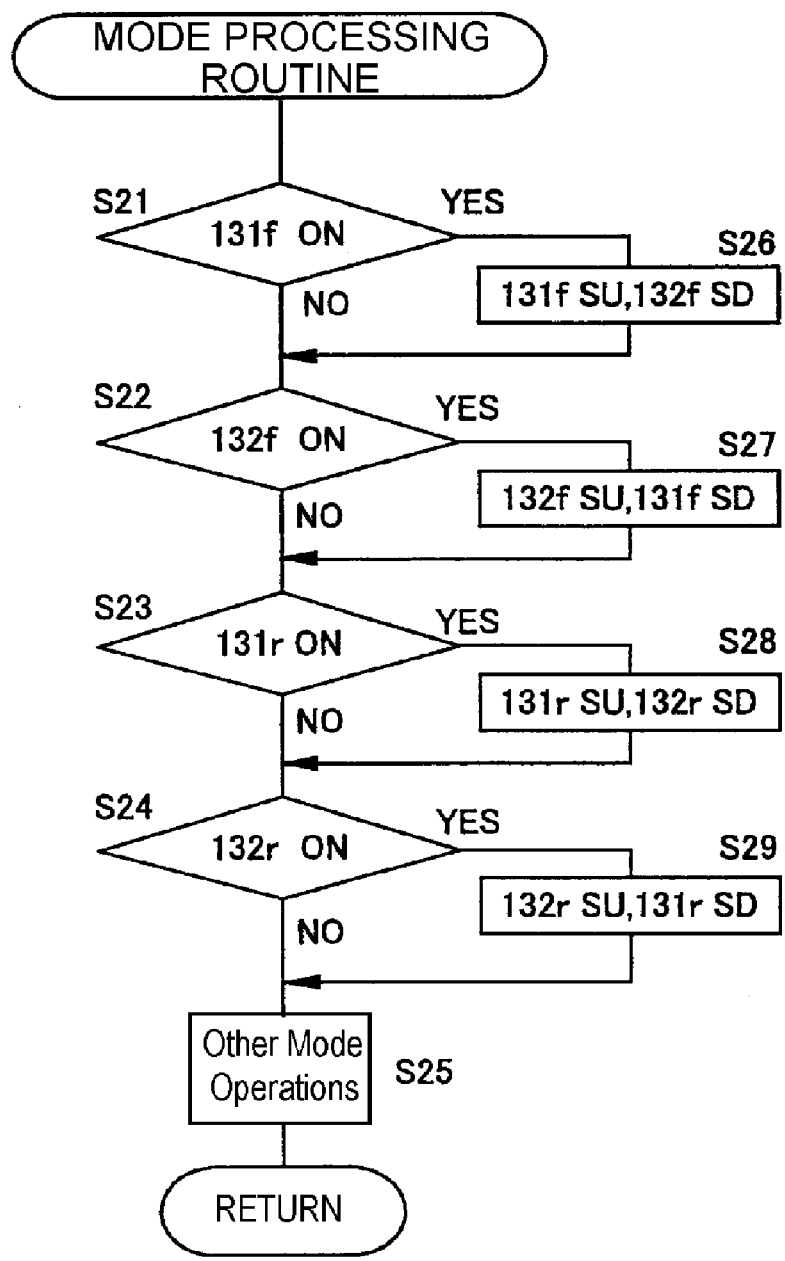
FIG. 9 is a flow chart of a particular embodiment of a mode processing routine.

As shown in FIG. 9, it is first determined in a step S21 whether or not front first switch 131f is turned on (i.e., a switch lever 125 in front shift control device 120*f* or 121*f* rotated from position P0 to position P1). If so, then processing moves to step S26 wherein front first switch 131*f* is designated for upshifting (SU) and front second switch 132*f* is designated for downshifting (SD). In other words, front derailleur 97*f* will be controlled to upshift when a front first switch 131*f* is turned on as a result of a switch lever 125 in front shift control device 120*f* or 121*f* rotating from position P0 to position P1, and front derailleur 97*f* will be controlled to downshift when a front second switch 132*f* is turned on as a result of a switch lever 125 in front shift control device 120*f* or 121*f* rotating from position P0 to position P2. In any event, it is then determined in a step S22 whether or not front second switch 132*f* is turned on (i.e., a switch lever 125 in front shift control device 120*f* or 121*f* rotated from position P0 to position P2). If so, then processing moves to step S27 wherein front second switch 132*f* is designated for upshifting (SU) and front first switch 131*f* is designated for downshifting (SD). In other words, front derailleur 97*f* will be controlled to upshift when a front second switch 132*f* is turned on as a result of a switch lever 125 in front shift control device 120*f* or 121*f* rotating from position P0 to position P2, and front derailleur 97*f* will be controlled to downshift when a front first switch 132*f* is turned on as a result of a switch lever 125 in front shift control device 120*f* or 121*f* rotating from position P0 to position P1.

In any event, it is then determined in a step S23 whether or not rear first switch 131*r* is turned on (i.e., a switch lever 125 in rear shift control device 120*r* or 121*r* rotated from position P0 to position P1). If so, then processing moves to step S28 wherein rear first switch 131*r* is designated for upshifting (SU) and rear second switch 132*r* is designated for downshifting (SD). In other words, rear derailleur 97*r* will be controlled to upshift when a rear first switch 131*r* is turned on as a result of a switch lever 125 in rear shift control device 120*r* or 121*r* rotating from position P0 to position P1, and rear derailleur 97*r* is controlled to downshift when a rear second switch 132*r* is turned on as a result of a switch lever 125 in rear shift control device 120*r* or 121*r* rotating from position P0 to position P2. In any event, it is then determined in a step S24 whether or not rear second switch 132*r* is turned on (i.e., a switch lever 125 in rear shift control device 120*r* or 121*r* rotated from position P0 to position P2). If so, then processing moves to step S29 wherein rear second switch 132*f* is designated for upshifting (SU), and rear first switch 131*r* is designated for downshifting (SD). In other words, rear derailleur 97*r* will be controlled to upshift when a rear second switch 132*r* is turned on as a result of a switch lever 125 in rear shift control device 120*r* or 121*r* rotating from position P0 to position P2, and rear derailleur 97*r* will be controlled to downshift when a rear first switch 132*f* is turned on as a result of a switch lever 125 in rear shift control device 120*r* or 121*r* rotating from position P0 to position P1. In any event, any other requested mode operations (including updating memory 138 with the new switch designations) are performed in a step S25, and then processing continues in step S4 in FIG. 8.

It is then determined in step S4 whether or not a designated front upshift switch has been turned on. If so, it is then determined in a step S11 whether or not front derailleur 97*f* is at the operating position for front sprocket F2. If so, then no further upshifting is possible, the upshift request is ignored, and processing continues at step S5. Otherwise, front derailleur is upshifted to sprocket F2 in a step S12. In any event, it is then determined in step S5 whether or not a designated front downshift switch has been turned on. If so, it is then determined in a step S13 whether or not front derailleur 97*f* is at the operating position for front sprocket F1. If so, then no further downshifting is possible, the downshift request is ignored, and processing continues at step S6. Otherwise, front derailleur 97*f* is downshifted to sprocket F1 in a step S14.

It is then determined in step S6 whether or not a designated rear upshift switch has been turned on. If so, it is then determined in a step S15 whether or not rear derailleur 97*r* is at the operating position for rear sprocket R10. If so, then no further upshifting is possible, the upshift request is ignored, and processing continues at step S7. Otherwise, rear derailleur 97*r* is upshifted to the next higher rear sprocket in a step S16. In any event, it is then determined in step S7 whether or not a designated rear downshift switch has been turned on. If so, it is then determined in a step S17 whether or not rear derailleur 97*r* is at the operating position for rear sprocket R1. If so, then no further downshifting is possible, the downshift request is ignored, and processing continues at step S8. Otherwise, rear derailleur 97*r* is downshifted to the next lower rear sprocket in a step S18.

In any event, it is then determined in a step S8 whether or not other operations have been requested (e.g., wheel diameter settings, gear position setting, etc.). If so, then such other operations are performed in a step 19. Processing then returns to step S2.

Figure 10:
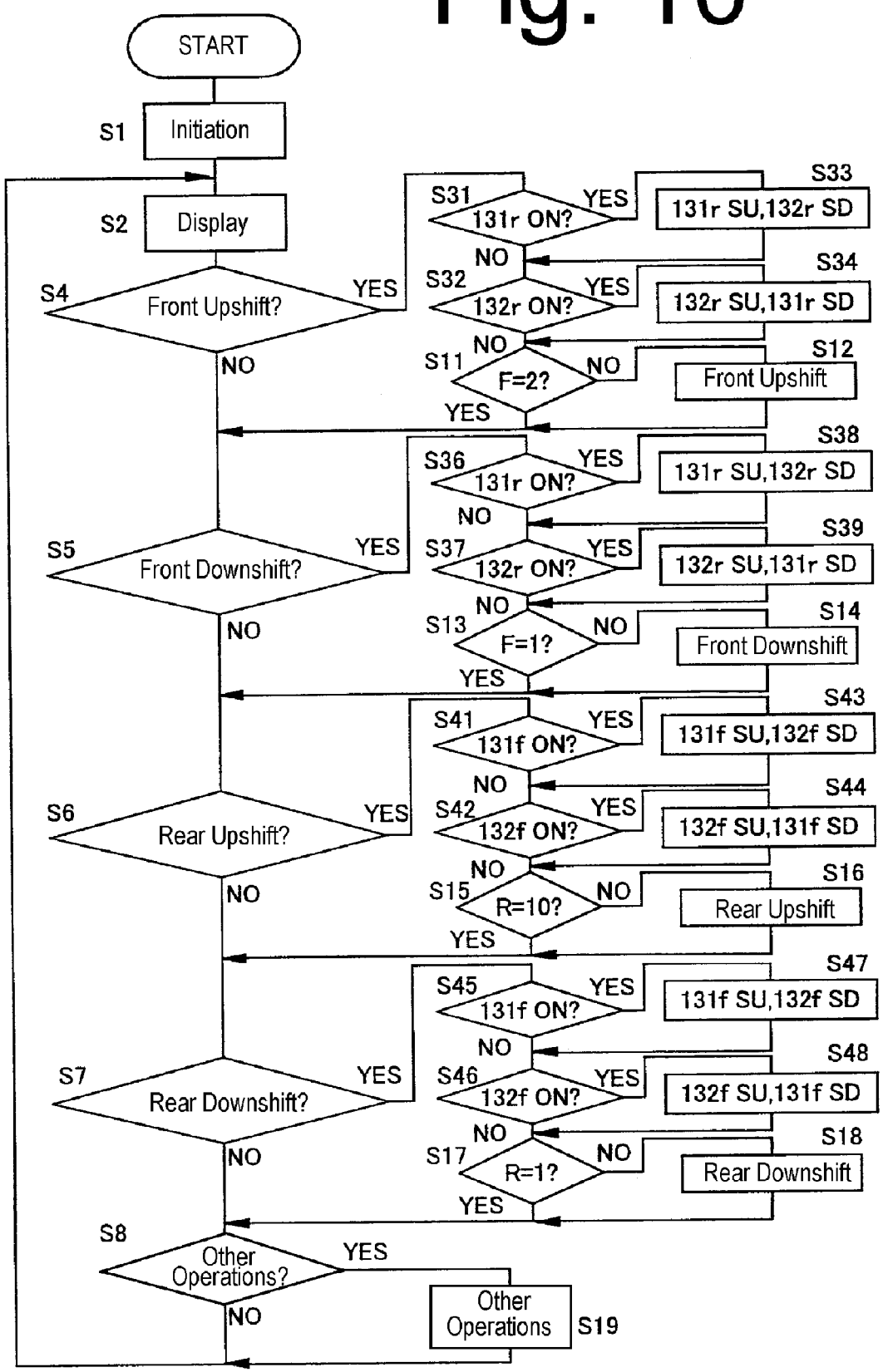
FIG. 10 is a flow chart of another embodiment of a switch designating process.

FIG. 10 is a flow chart of another embodiment of a switch designating process. Rather than make switch designations when operating in a switch designation mode in response to the operation of mode switch 136, switch designation unit 130*b* makes the designations during normal gear shift operations. In this embodiment, it is possible to change the switch designations for rear shift control devices 120*r* and 121*r* during the operation interval initiated by one of the front shift control devices 120*f* and 121*f*, and vice versa.

As shown in FIG. 10, initialization is carried out in step S1 when power is supplied to control unit 130, and display processing is performed in step S2 in the same manner as in FIG. 8. It is then determined in step S4 whether or not a currently designated front upshift switch has been turned on, thereby initiating an upshift operation for front derailleur 97*f*. If so, it is then determined in a step S31, while the upshift operation for front derailleur 97*f* is in progress, whether or not a rear first switch 131*r* has been turned on. If so, then processing moves to step S33 wherein rear first switch 131*r* is designated for upshifting (SU) and rear second switch 132*r* is designated for downshifting (SD). In any event, it is then determined in a step S32 whether or not a rear second switch 132*r* has been turned on. If so, then processing moves to step S34 wherein rear second switch 132*r* is designated for upshifting (SU) and rear first switch 131*r* is designated for downshifting (SD). If neither rear first switch 131*r* nor rear second switch 132*r* is turned on during the front upshift operation, it is then determined in step S11 whether or not front derailleur 97*f* is at the operating position for front sprocket F2. If so, then no further upshifting is possible, the upshift request is ignored, and processing continues at step S5. Otherwise, front derailleur is upshifted to sprocket F2 in step S12.

In any event, it is then determined in step S5 whether or not a designated front downshift switch has been turned on, thereby initiating a downshift operation for front derailleur 97*f*. If so, it is then determined in a step S36, while the downshift operation for front derailleur 97*f* is in progress, whether or not a rear first switch 131*r* has been turned on. If so, then processing moves to step S38 wherein rear first switch 131*r* is designated for upshifting (SU) and rear second switch 132*r* is designated for downshifting (SD). In any event, it is then determined in a step S37 whether or not a rear second switch 132r has been turned on. If so, then processing moves to step S39 wherein rear second switch 132r is designated for upshifting (SU) and rear first switch 131r is designated for downshifting (SD). If neither rear first switch 131r nor rear second switch 132r is turned on during the front downshift operation, it is then determined in step S13 whether or not front derailleur 97f is at the operating position for front sprocket F1. If so, then no further downshifting is possible, the downshift request is ignored, and processing continues at step S6. Otherwise, front derailleur 97f is downshifted to sprocket F1 in step S14.

In any event, it is then determined in step S6 whether or not a designated rear upshift switch has been turned on, thereby initiating an upshift operation for rear derailleur 97r. If so, it is then determined in a step S41, while the upshift operation for rear derailleur 97r is in progress, whether or not a front first switch 131f has been turned on. If so, then processing moves to step S43 wherein front first switch 131f is designated for upshifting (SU) and front second switch 132f is designated for downshifting (SD). In any event, it is then determined in a step S42 whether or not a front second switch 132f has been turned on. If so, then processing moves to step S44 wherein front second switch 132f is designated for upshifting (SU) and front first switch 131f is designated for downshifting (SD). If neither front first switch 131f nor front second switch 132f is turned on during the rear upshift operation, it is then determined in step S15 whether or not rear derailleur 97r is at the operating position for rear sprocket R10. If so, then no further upshifting is possible, the upshift request is ignored, and processing continues at step S7. Otherwise, rear derailleur 97r is upshifted to the next higher rear sprocket in step S16.

In any event, it is then determined in step S7 whether or not a designated rear downshift switch has been turned on, thereby initiating a downshift operation for rear derailleur 97r. If so, it is then determined in a step S45, while the downshift operation for rear derailleur 97r is in progress, whether or not a front first switch 131f has been turned on. If so, then processing moves to step S47 wherein front first switch 131f is designated for upshifting (SU) and front second switch 132f is designated for downshifting (SD). In any event, it is then determined in a step S46 whether or not a front second switch 132f has been turned on. If so, then processing moves to step S48 wherein front second switch 132f is designated for upshifting (SU) and front first switch 131f is designated for downshifting (SD). If neither front first switch 131f nor front second switch 132f is turned on during the rear downshift operation, it is then determined in step S17 whether or not rear derailleur 97r is at the operating position for rear sprocket R1. If so, then no further downshifting is possible, the downshift request is ignored, and processing continues at step S8. Otherwise, rear derailleur 97r is downshifted to the next lower rear sprocket in step S18.

In any event, it is then determined in step S8 whether or not other operations have been requested in the same manner as in FIG. 8. If so, then such other operations are performed in step 19, and processing returns to step S2.

Figure 11:
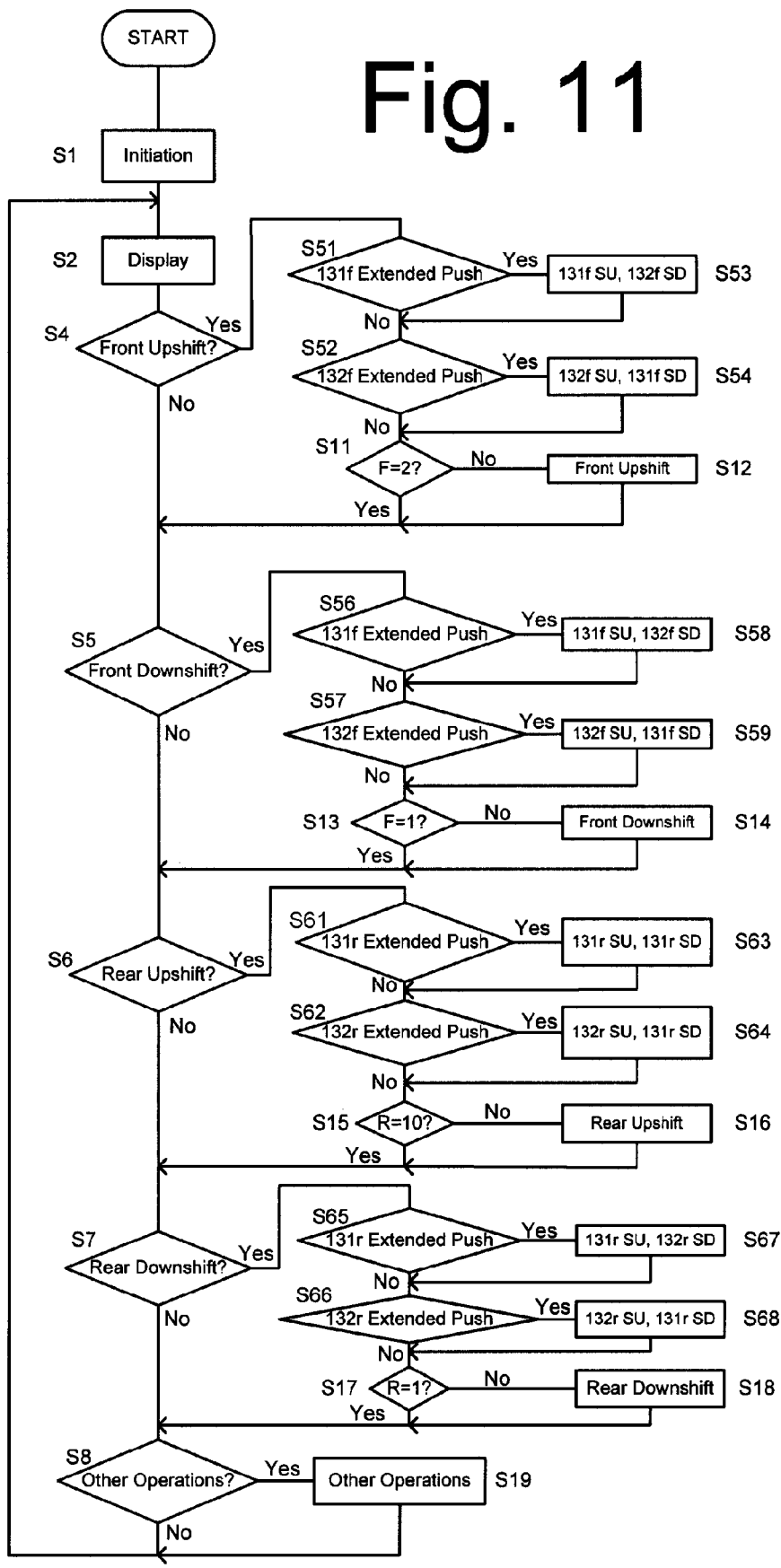
FIG. 11 is a flow chart of another embodiment of a switch designating process.

FIG. 11 is a flow chart of another embodiment of a switch designating process. In this embodiment, it is possible to change the switch designations for front shift control devices 120f and 121f during the operation interval initiated by one of the front shift control devices 120f and 121f by pressing one of the front first or second switches 131f or 132f for an extended period of time (e.g., two or more seconds). The same is true for rear shift control devices 120r and 121r.

As shown in FIG. 11, initialization is carried out in step S1 when power is supplied to control unit 130, and display processing is performed in step S2 in the same manner as in the previous embodiments. It is then determined in step S4 whether or not a currently designated front upshift switch has been turned on, thereby initiating an upshift operation for front derailleur 97f. If so, it is then determined in a step S51, while the upshift operation for front derailleur 97f is in progress, whether or not a front first switch 131f has been turned on for an extended period of time. If so, then processing moves to step S53 wherein front first switch 131f is designated for upshifting (SU) and front second switch 132f is designated for downshifting (SD). In any event, it is then determined in a step S52 whether or not a front second switch 132f has been turned on for an extended period of time. If so, then processing moves to step S54 wherein front second switch 132f is designated for upshifting (SU) and front first switch 131f is designated for downshifting (SD). If neither front first switch 131f nor front second switch 132f is turned on for an extended period of time during the front upshift operation, it is then determined in step S11 whether or not front derailleur 97f is at the operating position for front sprocket F2. If so, then no further upshifting is possible, the upshift request is ignored, and processing continues at step S5. Otherwise, front derailleur is upshifted to sprocket F2 in a step S12.

In any event, it is then determined in step S5 whether or not a designated front downshift switch has been turned on, thereby initiating a downshift operation for front derailleur 97f. If so, it is then determined in a step S56, while the downshift operation for front derailleur 97f is in progress, whether or not a front first switch 131f has been turned on for an extended period of time. If so, then processing moves to step S58 wherein front first switch 131f is designated for upshifting (SU) and front second switch 132f is designated for downshifting (SD). In any event, it is then determined in a step S57 whether or not a front second switch 132f has been turned on for an extended period of time. If so, then processing moves to step S59 wherein front second switch 132f is designated for upshifting (SU) and front first switch 131f is designated for downshifting (SD). If neither front first switch 131f nor front second switch 132f is turned on for an extended period of time during the front downshift operation, it is then determined in step S13 whether or not front derailleur 97f is at the operating position for front sprocket F1. If so, then no further downshifting is possible, the downshift request is ignored, and processing continues at step S6. Otherwise, front derailleur 97f is downshifted to sprocket F1 in step S14.

In any event, it is then determined in step S6 whether or not a designated rear upshift switch has been turned on, thereby initiating an upshift operation for rear derailleur 97r. If so, it is then determined in a step S61, while the upshift operation for rear derailleur 97r is in progress, whether or not a rear first switch 131r has been turned on for an extended period of time. If so, then processing moves to step S63 wherein rear first switch 131r is designated for upshifting (SU) and rear second switch 132r is designated for downshifting (SD). In any event, it is then determined in a step S62 whether or not a rear second switch 132r has been turned on for an extended period of time. If so, then processing moves to step S64 wherein rear second switch 132r is designated for upshifting (SU) and rear first switch 131r is designated for downshifting (SD). If neither rear first switch 131r nor rear second switch 132r is turned on for an extended period of time during the rear upshift operation, it is then determined in step S15 whether or not rear derailleur 97r is at the operating position for rear sprocket R10. If so, then no further upshifting is possible, the upshift request is ignored, and processing continues at step S7. Otherwise, rear derailleur 97r is upshifted to the next higher rear sprocket in step S16.

In any event, it is then determined in step S7 whether or not a designated rear downshift switch has been turned on, thereby initiating a downshift operation for rear derailleur 97r. If so, it is then determined in a step S65, while the downshift operation for rear derailleur 97r is in progress, whether or not a rear first switch 131r has been turned on for an extended period of time. If so, then processing moves to step S67 wherein rear first switch 131r is designated for upshifting (SU) and rear second switch 132r is designated for downshifting (SD). In any event, it is then determined in a step S66 whether or not a rear second switch 132f has been turned on for an extended period of time. If so, then processing moves to step S68 wherein rear second switch 132r is designated for upshifting (SU) and rear first switch 131r is designated for downshifting (SD). If neither rear first switch 131r nor rear second switch 13rf is turned on for an extended period of time during the rear downshift operation, it is then determined in step S17 whether or not rear derailleur 97r is at the operating position for rear sprocket R1. If so, then no further downshifting is possible, the downshift request is ignored, and processing continues at step S8. Otherwise, rear derailleur 97r is downshifted to the next lower rear sprocket in step S18.

In any event, it is then determined in step S8 whether or not other operations have been requested. If so, then such other operations are performed in step 19 in the same manner as the previous embodiments, and processing returns to step S2.

While the above is a description of various embodiments of inventive features, further modifications may be employed without departing from the spirit and scope of the present invention. For example, in the third embodiments the switch designation was requested by operating one of the front and rear first and second switches 131f, 132f, 131r and 132r for an extended period of time, but a switch designation request could be made by some other distinctive operation of a switch, such as by double-clicking. While the described embodiments were applied to a road bicycle, the bicycle may have any configuration. While both derailleurs were electrically controlled, one of the derailleurs may be manually controlled. Also, the teachings herein could be applied to an internal hub transmission or to a combination of a derailleur and hub transmission.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A switch designation apparatus for a bicycle control unit comprising:
   a first switch structured to be mounted to a bicycle for providing signals to operate a bicycle control device so that the bicycle control device operates in a first operating manner;
   a second switch structured to be mounted to the bicycle for providing signals to operate the bicycle control device so that the bicycle control device operates in a second operating manner, wherein the second operating manner is different from the first operating manner;
   a memory that stores a designation of the operating manner of the first switch and a designation of the operating manner of the second switch; and
   a switch designation unit that allows a user to selectively store the designation of the operating manner of the first switch and the designation of the operating manner of the second switch in the memory;
   wherein operation of the first switch causes the switch designation unit to store the designation of the second operating manner in the memory so that the second operating manner is associated with the first switch and causes the switch designation unit to store a designation of an operating manner in the memory so that the operating manner is associated with the second switch.

2. The apparatus according to claim 1 wherein the first switch and the second switch form part of a shift control device that is manually operated to operate a bicycle transmission.

3. The apparatus according to claim 1 wherein the first operating manner comprises a first operating movement of the bicycle control device, wherein the second operating manner comprises a second operating movement of the bicycle control device, and wherein the first operating movement of the bicycle control device signaled by the first switch is different from the second operating movement of the bicycle control device signaled by the second switch.

4. The apparatus according to claim 3 wherein the first operating movement is opposite the second operating movement.

5. The apparatus according to claim 1 wherein the first operating manner and the second operating manner comprise operating movements of the bicycle control device, and wherein operating movements of the bicycle control device signaled by the first switch and the second switch comprise at least one of a transmission upshift movement or a transmission downshift movement.

6. The apparatus according to claim 5 wherein operating movements of the bicycle control device signaled by the first switch and the second switch comprise at least one of a derailleur upshift movement or a derailleur downshift movement.

7. The apparatus according to claim 5 wherein operating movements of the bicycle control device signaled by the first switch and the second switch comprise at least one of an internal hub transmission upshift movement or an internal hub transmission downshift movement.

8. The apparatus according to claim 1 further comprising an operating member, wherein the operating member moves toward a first position to operate the first switch, and wherein the operating member moves toward a second position different from the first position to operate the second switch.

9. The apparatus according to claim 8 wherein the operating member moves from a home position toward the first position, and wherein the operating member moves from the home position toward the second position.

10. The apparatus according to claim 9 wherein the home position is disposed between the first position and the second position.

11. The apparatus according to claim 9 wherein the operating member rotates from the home position toward the first position, and wherein the operating member rotates from the home position toward the second position.

12. The apparatus according to claim 1 wherein operation of the first switch causes the switch designation unit to store the designation of the first operating manner in the memory so that the first operating manner is associated with the second switch.

13. The apparatus according to claim 1 wherein the switch designation unit has a switch designation operative mode and a switch designation inoperative mode, wherein operation of the first switch causes the switch designation unit to store the designation of the second operating manner in the memory so that the second operating manner is associated with the first switch when the switch designation unit is in the switch designation operative mode, and wherein operation of the first switch does not cause the switch designation unit to store the designation of the second operating manner in the memory so that the second operating manner is associated with the first switch when the switch designation unit is in the switch designation inoperative mode.

14. The apparatus according to claim 13 further comprising a mode switch that provides signals to selectively put the switch designation unit into the switch designation operative and switch designation inoperative modes.

15. The apparatus according to claim 1 wherein operation of the first switch for a predetermined time interval causes the switch designation unit to store the designation of the second operating manner in the memory so that the second operating manner is associated with the first switch.

16. The apparatus according to claim 1 wherein the first operating manner and the second operating manner comprise kinds of operating movements of the bicycle control device, and wherein operation of the first switch after a signal has been initiated to operate the bicycle control device and before movement of the operating bicycle control device is completed causes the switch designation unit to store the designation of the second operating manner in the memory so that the second operating manner is associated with the first switch.

17. The apparatus according to claim 1 wherein the first switch provides signals to operate the bicycle control device to move in one of at least two different directions, and wherein the second switch provides signals to operate the bicycle control device to move in one of at least two different directions.

18. The apparatus according to claim 17 wherein the at least two different directions include an upshift direction and a downshift direction.

* * * * *